(12) United States Patent  
Qi

(10) Patent No.: US 12,207,347 B2
(45) Date of Patent: Jan. 21, 2025

(54) VERIFICATION INFORMATION PROCESSING METHOD AND APPARATUS, TERMINAL DEVICE AND STORAGE MEDIUM

(71) Applicant: BEIJING XIAOMI MOBILE SOFTWARE CO., LTD., Beijing (CN)

(72) Inventor: Jianfeng Qi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 302 days.

(21) Appl. No.: 17/566,295

(22) Filed: Dec. 30, 2021

(65) Prior Publication Data
US 2022/0408238 A1   Dec. 22, 2022

(30) Foreign Application Priority Data

Jun. 18, 2021   (CN) .......................... 202110679836.9

(51) Int. Cl.
 H04W 8/18 (2009.01)
 G06F 21/44 (2013.01)
 G06F 21/60 (2013.01)
 H04W 56/00 (2009.01)
 H04W 76/14 (2018.01)

(52) U.S. Cl.
 CPC .............. H04W 8/18 (2013.01); G06F 21/44 (2013.01); G06F 21/606 (2013.01); H04W 56/001 (2013.01); H04W 76/14 (2018.02)

(58) Field of Classification Search
 None
 See application file for complete search history.

(56) References Cited

U.S. PATENT DOCUMENTS 11,050,691 B1 *  6/2021  DePue ................ H04W 12/062
2018/0006818 A1   1/2018  Ren
2018/0234833 A1   8/2018  Tang et al.
(Continued)

FOREIGN PATENT DOCUMENTS

CN   104717066 A   6/2015
CN   105245541 A   1/2016
(Continued)

OTHER PUBLICATIONS

Extended European Search Report in Application No. 21218017.8, dated Jun. 20, 2022,(7p).

(Continued)

*Primary Examiner* — Diane L Lo
(74) *Attorney, Agent, or Firm* — Arch & Lake LLP

(57) ABSTRACT

The present disclosure relates to a verification information processing method and an apparatus, a terminal device and a storage medium thereof. A verification information processing method applied to a first device includes in response to entering a verification scenario of performing a predetermined function, sending request information to a second device; receiving response information returned based on the request information; and writing verification information carried in the response information into an input position of the verification information; wherein the verification information written into the input position is used to verify whether the first device performs the predetermined function.

19 Claims, 6 Drawing Sheets

(56) References Cited

U.S. PATENT DOCUMENTS

| | | | |
|---|---|---|---|
| 2019/0036924 A1* | 1/2019 | Wang | H04W 76/10 |
| 2019/0318122 A1* | 10/2019 | Hockey | G06Q 20/02 |
| 2019/0372949 A1 | 12/2019 | Sanciangco et al. | |
| 2021/0264018 A1* | 8/2021 | Helles | G06F 21/45 |

FOREIGN PATENT DOCUMENTS

| | | |
|---|---|---|
| CN | 106130998 A | 11/2016 |
| CN | 108419232 A | 8/2018 |
| CN | 108769059 A | 11/2018 |
| CN | 111726268 A | 9/2020 |
| WO | 2021115199 A1 | 6/2021 |

OTHER PUBLICATIONS

The First CNOA issued in CN Application No. 202110679836.9 dated Apr. 10, 2024 with English translation, (15p).

The State Intellectual Property Office of People's Republic of China, "The Second Office Action" issued in Application No. 202110679836.9 dated Oct. 31, 2024, with English translation, (19p).

\* cited by examiner

VERIFICATION INFORMATION PROCESSING METHOD AND APPARATUS, TERMINAL DEVICE AND STORAGE MEDIUM

CROSS REFERENCE TO RELATED APPLICATION

This application is based upon and claims priority to Chinese Patent Application No. 202110679836.9, field on Jun. 18, 2021, the entire disclosure of which is incorporated herein by reference for all purposes.

TECHNICAL FIELD

The present disclosure relates to the field of communication technology, and in particular to a verification information processing method and an apparatus, a terminal device and a storage medium thereof.

BACKGROUND

With the development of electronic technology, functions of terminal devices are becoming more and more powerful, and terminal devices can perform various functions. However, some of these functions are related to the user's information security and property security. When performing functions related to information security and/or property security, it is usually necessary to perform verification in conjunction with a Short Messaging Service (SMS). Relevant operations can be performed after the verification is passed. However, in the process of use, users may encounter various problems of inconvenience in verification, such as poor intelligence of the terminal devices, large verification delay and poor user experience.

SUMMARY

According to a first aspect of the present disclosure, there is provided a verification information processing method applied to a first device. The verification information processing method may include: in response to entering a verification scenario of performing a predetermined function, sending request information to a second device; receiving response information returned based on the request information; and writing verification information carried in the response information into an input position of the verification information; wherein the verification information written into the input position is used to verify whether the first device performs the predetermined function.

According to a second aspect of the present disclosure, there is provided a verification information processing method applied to a second device. The verification information processing method may include: receiving verification information; receiving request information sent by a first device; and based on the request information, sending response information carrying the verification information to the first device, wherein the verification information is used by the first device to verify whether the first device performs a predetermined function.

According to a third aspect of the disclosure, there is provided a terminal device. The terminal device may include memory for storing instructions executable by a processor; and the processor configured to connect with the memory; wherein the processor is configured to: in response to entering a verification scenario of performing a predetermined function, send request information to a second device; receive response information returned based on the request information; and write verification information carried in the response information into an input position of the verification information; wherein the verification information written into the input position is used to verify whether the first device performs the predetermined function.

BRIEF DESCRIPTION OF THE DRAWINGS

The drawings herein are incorporated into the specification and constitute a part of the specification, show examples consistent with the disclosure, and are used together with the specification to explain the principle of the disclosure.

DETAILED DESCRIPTION

Figure 1:
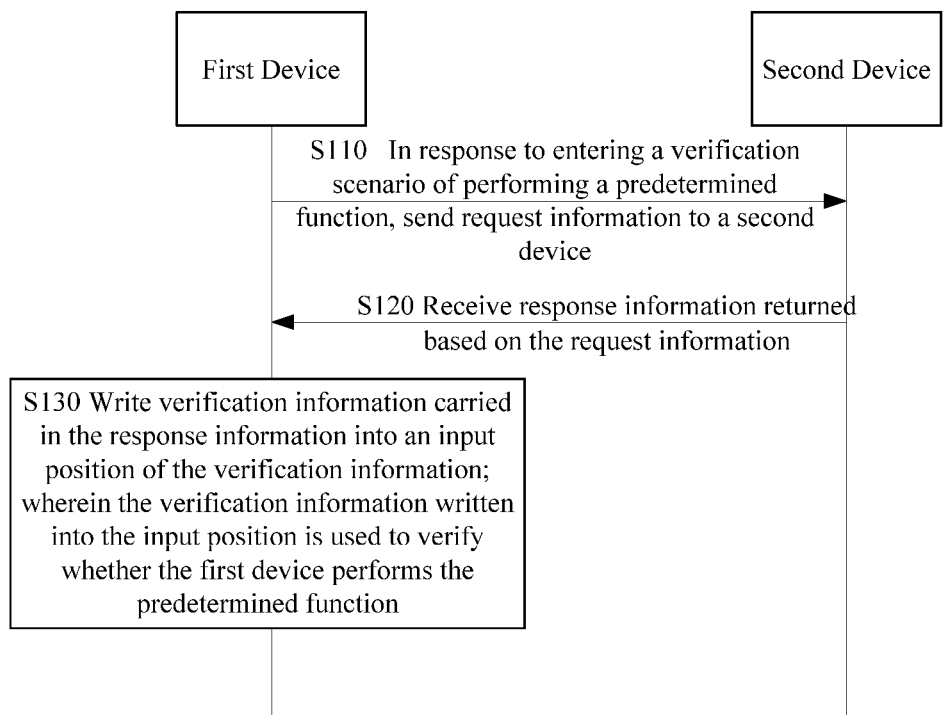
FIG. 1 is a schematic flowchart of a verification information processing method according to one or more examples of the present disclosure.

Here, exemplary embodiments will be described in detail, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of devices consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

As shown in FIG. 1, an example of the present disclosure provides a verification information processing method, which is applied to a first device, and the method includes the following steps:
- S110: in response to entering a verification scenario of performing a predetermined function, sending request information to a second device;
- S120: receiving response information returned based on the request information;
- S130: writing verification information carried in the response information into an input position of the verification information; wherein the verification information written into the input position is used to verify whether the first device performs the predetermined function.

The first device herein may be various electronic devices. For example, the first device may include various smart home devices, wearable devices, tablet computers, or smart office devices.

In some examples, the first device may be a device that lacks a functional module that directly receives the verification information; and the second device is a device that has a functional module that receives the verification information. For example, the first device may lack a subscriber identity module (SIM). The subscriber identity module (SIM) may be a subscriber identity module including a physical card, or an electronic subscriber identity module, i.e., eSIM. Furthermore, the SIM may also include USIM or miroSIM, etc., which depends on the model of the subscriber identity module. In short, in the examples of the present disclosure, the SIM may be a functional module for connecting the device to cellular mobile communication. At this time, the verification information may be issued in the form of a short message.

For example, the first device is a device without a subscriber identity module installed, and the second device is a device with a subscriber identity module installed. Identification information of the subscriber identity module of the second device is identification information obtained in the verification scenario.

In another example, the first device may also be a functional module capable of receiving the verification information itself, and the second device may be a device which determined that the verification information is received based on information entering into a verification interface of the verification scenario.

The verification information may specifically include at least one of: a verification code composed of one or more character strings; an authorization token; a verification link with a verification function, etc.

In the example of the present disclosure, the predetermined function may be a function that needs to perform verification. For example, some predetermined functions includes, but are not limited to, the following functions: an application installation; an application uninstallation; a payment function; login in a specific application; a transfer function; a loan application function.

In the example of the present disclosure, when entering the verification scenario of performing the predetermined function, the first device will obtain information such as communication identification and the like of the second device.

For example, when entering the verification scenario of the predetermined function, a verification interface will be displayed, and the verification interface will receive the communication identification of the second device input by the user via a human-computer interaction interface, such as the mobile phone number of the second device, etc.

In another example, after entering the verification scenario of the predetermined function, the verification interface is displayed; and then according to one or more historical verification operation, the first device displays, by using a first display parameter, candidate communication identifications at the input position for inputting the communication identification on the verification interface. After detecting a selection operation for the candidate communication identifications, the first device switches the display parameter of the selected candidate communication identifications from the first display parameter to a second display parameter, and a communication identification whose display parameter is switched to the second display parameter is the communication identification of the second device. The first display parameter and the second display parameter herein may have different brightness parameters, different gray values, or different color values.

In some examples, the communication identification may also be an email address, and is not limited to communication identification such as the mobile phone number.

After sending the request information to the second device, the first device will receive the response information returned by the second device based on the request information.

If the second device successfully receives the verification information, a verification server corresponding to the verification scenario sends the verification information to the second device; the second device sends the verification information to the first device via the response information. In this way, the first device obtains the verification information from the second device. Furthermore, the first device can automatically write the verification information to the input position of the verification information without the need for the user to manually fill in.

Once the verification information is written to the input position, the first device automatically executes a trigger operation to start the verification, so as to perform the verification operation of the verification information. For example, the first device uses the verification information obtained from the input position to interact with the verification server, that is, sends the verification information written in the input position to the verification server according to a format given by the verification server, so that the verification server can verify and authenticate the information.

The trigger operation for starting the verification herein includes one or more operations corresponding to a confirmation control, a start control, a verification control or a completion control and other controls at the input position of the verification information. If a user operation acting on these controls is detected, it is equivalent to triggering the start of verification based on the user operation.

In one example, the first device may run a script that simulates user operations; after the verification information is written to the input position, the corresponding script is executed to trigger the start of verification.

In another example, in some verification scenarios, as long as there is no further input within a preset period of time after verification information is written, the start of verification will be automatically triggered. If the first device is in this verification scenario, then the first device writes the verification information read from the second device into the input position by running scripts and other program codes, waits for the preset period of time, and then automatically starts the verification.

In short, in the examples of the present disclosure, if the verification information of the first device needs to be received by the second device, then the first device will automatically request the verification information from the second device, and the verification information received by the second device should be sent synchronously to the first device, thus the verification information is automatically inputted into the position where the verification information should to be entered and the user does not need to fill the verification information manually, which simplifies user operations and reduces the verification delay caused by the user's need to find the second device when the second device is not at the user's hand and then manually enter it, and further improves the device's intelligence and user experience.

In the examples of the present disclosure, in order to ensure the security of information interaction and reduce the leakage of verification information, the information interaction between the first device and the second device is implemented in the form of control signaling. For example, the request information sent by the first device to the second device is sent in the form of signaling words; and the response information received by the first device from the second device is also sent in the form of signaling words. The interaction based on signaling words requires both the first device and the second device have the coding and decoding rules of the signaling words in advance. In this way, without knowing the coding and decoding rules of the signaling words, other devices cannot directly obtain the verification information when obtaining the signaling words including the verification information, thereby improving the security of the verification information.

The technical solutions provided by the examples of the present disclosure may include the following beneficial effects. After the first device enters the verification scenario, if it needs to use the second device to receive verification information, it would actively send request information requesting verification information to the second device. In this way, the second device can return, based on the request information, the verification information received by itself to the first device, thus there is no need for user to find the second device, click on the verification information received by the second device, and manually enter the verification information into the input position of verification information on the first device. Therefore, in the solutions provided by the present disclosure, by using the high-speed data transmission between the first device and the second device, writing the verification information of the first device is realized, the verification rate of the first device is increased, and the user operations in the verification process of the first device is simplified.

Figure 2:
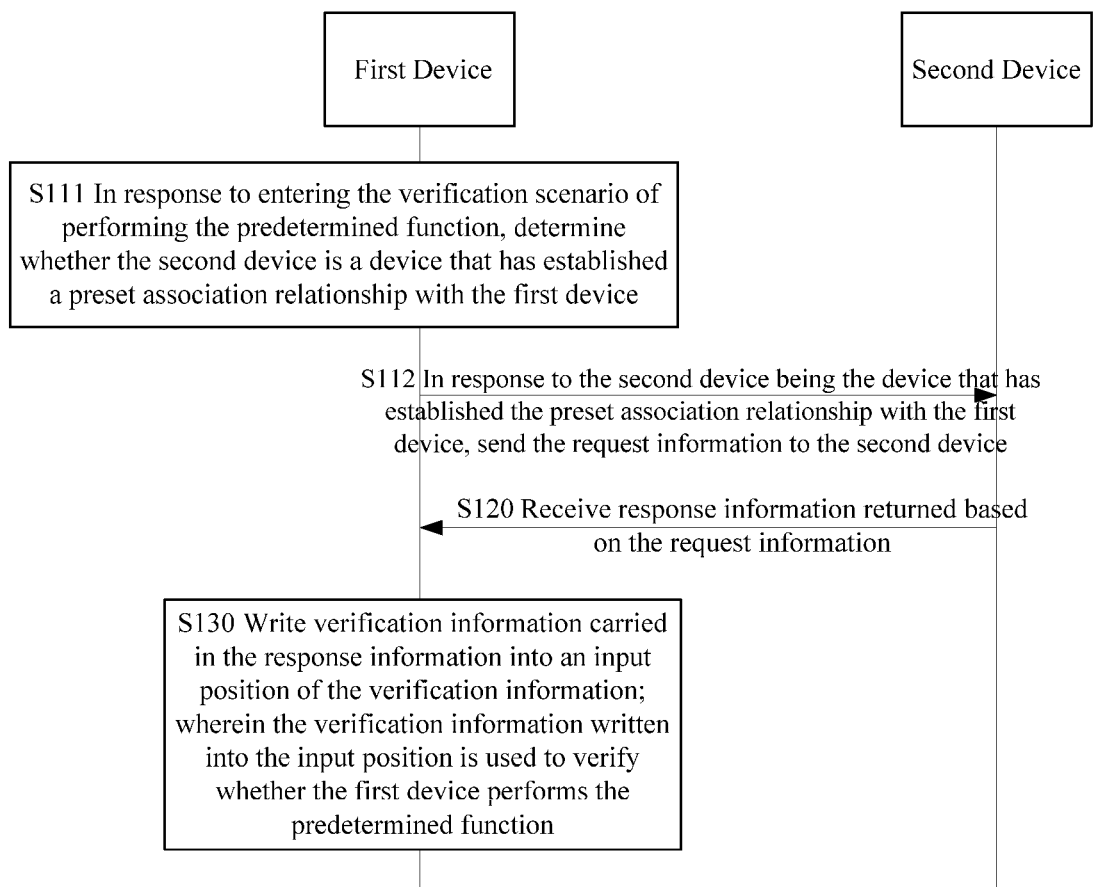
FIG. 2 is a schematic flow chart showing a method for processing verification information according to one or more examples of the present disclosure.

In some examples, as shown in FIG. 2, the S110 may include:

S111: in response to entering the verification scenario of performing the predetermined function, determining whether the second device is a device that has established a preset association relationship with the first device;

S112: in response to the second device being the device that has established the preset association relationship with the first device, sending the request information to the second device.

In the examples of the present disclosure, in order to ensure the security of the verification information of the first device and/or to facilitate the first device to receive the verification information from the second device, it is determined whether the second device is the device that has established an association relationship with the first device, if the second device is the device that has already established the association relationship, the first device may directly send the request information to the second device; if the second device is not the device that has established the association relationship, the request information may not be sent or the request information may be postponed.

There are many ways to establish the association relationship between the second device and the first device. For example, several options are provided as follows.

Option 1: the second device has stored device information of the first device;

Option 2: the second device and the first device are registered at the server and a binding relationship is established;

Option 3: a verification information synchronization function has been enabled form the first device with respect to the second device, and/or, the verification information synchronization function has been enabled form the second device with respect to the first device, that is, the verification information synchronization function has been enabled between the first device and the second device;

Option 4: the first device and the second device are devices with shared accounts.

If one or more of the above options are satisfied, the second device and the first device can be regarded as devices that have the association relationship with each other.

Of course, the foregoing examples are only examples of establishing the association relationship between the first device and the second device, and the specific implementation is not limited to any of the foregoing examples.

The determining whether the second device is a device that shares an account with the first device includes at least one of:

determining whether the second device and the first device are devices that share a user account;

determining whether the second device and the first device are devices that share a network account of a private network;

determining whether the second device and the first device are devices that share a payment account.

For example, when setting the user account for the mobile phone and smart wearable device of the same user, the mobile phone and tablet of the same user, as well as the mobile phone and smart home device of the same user, one user account can be used, that is, it can be seen from the equipment manufacturer that the mobile phone and smart wearable device of the same user belong to one user account, so as to achieve unified control to devices or help account sharing.

For example, Xiaomi's mobile phone, Xiaomi's wearable device, and Xiaomi's home device of the same Xiaomi's user may use the same user account, i.e., one user account.

For example, both the second device and the first device can access a private network via WiFi, and the private network is a non-public network and is not a network that any device can log in without security code. If the second device and the first device are connected to the network through the same private network, the two devices share the network account of the private network, that is, two devices can trust each other, since the security of private networks is higher than that of public networks.

For example, when at home, the user's mobile phone and smart home device use the same WiFi account in home, and the WiFi account is one of the accounts shared by the first device and the second device.

In some examples, both the first device and the second device can perform some functions that require payment. If the first device and the second device are bound to the same payment account, it can also be considered that the two devices are devices have established the association relationship.

For example, two devices of the same user may be bound with the same bank card number or payment account on the Internet platform. The Internet platform payment account herein includes but is not limited to: Alipay Pay account, JD Pay account and/or WeChat Pay account, etc.

In the scenario of sharing a network account and/or payment account, even if the two devices do not belong to the same user, the two users belonging to family members and/or lovers may be automatically identified there is an association relationship between the first device and the second device due to the shared network account and/or payment account, thus the application range of the verification information processing method provided by the examples of the present disclosure is expanded.

In examples of the present disclosure, the determining of whether there is a shared account between the first device and the second device can be realized through information interaction. For example, the first device may interact at least one account used by at least one party with the second device before the verification information is formally interacted.

In another example, if two devices both stored the device information of the other party in advance, then whether current first device and second device are two devices having the shared account can be determined according to the device information of the other party.

In some examples, the priority of determining whether the second device is a device that shares an account with the first device (i.e., the priority of determining the sharing association relationship) may higher than the priority of determining whether the verification information synchronization function is enabled form the first device with respect to the second device.

The activation of the verification information synchronization function is a supplement to the association relationship established between two devices. For example, when two devices do not have a shared account or when it is not convenient to share an account, another device is needed for verification, it can be achieved through the verification information synchronization function, that is, the second device receives the verification information instead of the first device, and forwards it to the first device.

The verification information processing method may further includes following steps:

in response to that the second device is not the device that shares the account with the first device, and the first device has not enabled the verification information synchronization function with respect to the second device, displaying a prompt for enabling the verification information synchronization function;

in response to detecting an input operation for the enabling prompt, determining whether to enable or turn on the verification information synchronization function of the first device with respect to the second device;

if the first device automatically detects that the second device does not share the account with the first device, and the verification information synchronization function is not turned on or enabled, displaying a prompt to enable the verification information synchronization function. If it detects an input operation that indicates that user agrees to enable the verification information synchronization function, the first device and the second device will automatically enable or turn on the verification information synchronization function. After the verification information synchronization function is turned on or enabled, an association relationship is established between the first device and the second device.

The enabling prompt herein may be prompt information for prompting user to enable or turn on the verification information synchronization function of the first device with respect to the second device. The enabling prompt may be an enabling prompt output in the form of a dialog box, an enabling prompt output in the form of a drop-down menu, and the like. In short, there are many specific forms of enabling prompts, and will not be limited herein one by one.

In some examples, the association relationship established by enabling or turning on the verification information synchronization function may be a permanent association relationship, that is, if no detected message indicates that the user explicitly instructs to release the association relationship, the association relationship should be maintained by default. In this way, if the verification information synchronization function is enabled once between the two devices, there is no need to enable it again later.

In other examples, the association relationship established by enabling the verification information synchronization function may be a one-time, that is, after the synchronization of the verification information is completed this time, the verification information synchronization function is automatically disabled. For two devices that do not have a shared account and so on and may use other ways to establish an association relationship, the verification information needs to be synchronized again next time, and the verification information synchronization function needs to be turned on or enabled again to achieve the establishment of the association relationship.

In other examples, the association relationship established by turning on the verification information synchronization function may continue for a period of time, and the two devices that have the verification information synchronization function turned on during this period of time have the association relationship established, but after this period of time, the association relationship between the two devices ends.

The step of in response to detecting an input operation for the enabling prompt, determining whether to enable or turn on the verification information synchronization function of the first device with respect to the second device may include:

in response to the input operation being a first operation indicating a permission to enable or turn on the verification information synchronization function, enabling or turning on the verification information synchronization function of the first device with respect to the second device;

and/or, in response to the input operation being a second operation indicating that a prohibition to enable or turn on the verification information synchronization function, disabling (i.e., don't enabling or turning on) the verification information synchronization function of the first device with respect to the second device and stopping the display of the enabling prompt.

If it is forbidden to start the verification information synchronization function, it needs to wait for the user to manually input the verification information to perform verification.

In some examples, the S110 may include:

before sending the request information to the second device, determining whether the first device and the second device have established a connection; and in response to the first device and the second device have established the connection, sending the request information to the second device through the connection.

Herein, the connection between the first device and the second device may be a direct connection, that is, a connection established without a network. For example, Bluetooth connection between the first device and the second device, WiFi direct connection between the first device and the second device, and/or Device To Device (D2D) connection between the first device and the second device. If a connection is established between the first device and the second device, the first device and the second device can interact information with each other through this connection, so that the first device can successfully obtain the verification information from the second device. In this way, since the verification information is not transmitted through the network when the verification information is interacted between the first device and the second device, the possibility of leakage is reduced and the security of the verification information is improved.

In some examples, of course, the connection between the first device and the second device can also be a network connection of the network. If the connection is through the network, the first device and the second device can negotiate a secret key before formally transmitting the verification information, thus improving the transmission success rate of verification information.

In other examples, the connection between the first device and the second device may not be established. Generally, the distance between the two devices that share the account is not too far, or the distance between the two devices that specifically enable verification information synchronization function may not be too far, so the first device and the second device can directly broadcast the request for verification information and broadcast the reception of verification information on various wireless communication broadcast channels, such as WiFi broadcast channels or Bluetooth broadcast channels. Of course, information is sent and received in a broadcast manner. To ensure information security, the method may further include: the first device may transmit the verification information in a broadcast form when the first device determining that it is in a private space based on its own location. The private space herein includes but is not limited to: home, office or private car.

In some examples, the verification scenario of performing the predetermined function includes, but is not limited to, at least one of the following:

a verification scenario for application installation;

a verification scenario for a plurality of devices to establish a network;

a verification scenario for payment;

a verification scenario for changing account information, wherein the changes of the account information include: a change of an account name and/or a change of a password;

a verification scenario for login in or registering; and a verification scenario for creating a group.

For example, a scenario for login in or registering may include: a scenario of logging in to a bank APP, a scenario of logging in to a social account with a payment function, and the like.

In short, the above are only examples of verification scenarios. There are other verification scenarios in the specific implementation process, which will not illustrate one by one herein.

Figure 3A:
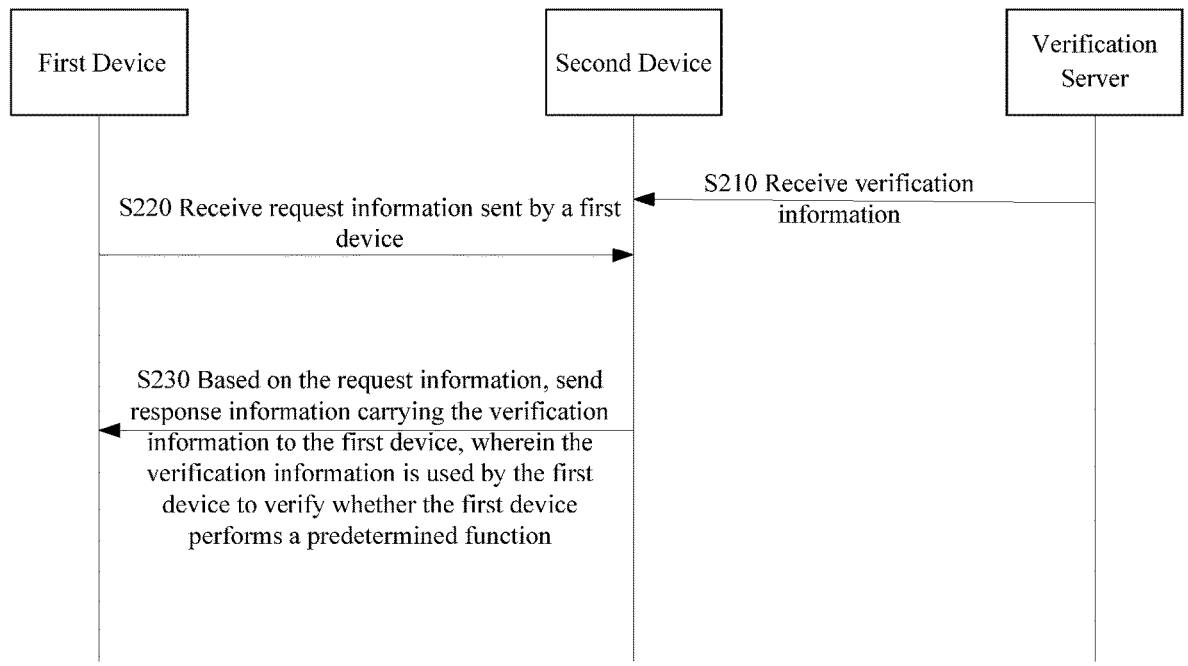
FIG. 3A is a schematic flow chart showing a verification information processing method according to one or more examples of the present disclosure.

FIG. 3A shows a verification information processing method according to some examples of the present disclosure, which is applied to a second device, and the verification information processing method includes the following steps:

S210: receiving verification information;

S220: receiving request information sent by a first device;

S230: based on the request information, sending response information carrying the verification information to the first device, wherein the verification information is used by the first device to verify whether the first device performs a predetermined function.

The second device in the example of the present disclosure may be any terminal device capable of receiving the verification information, for example, a mobile phone.

For example, the verification information may be sent in the form of short messages, emails, or be sent by instant messaging software, such as WeChat.

Figure 3B:
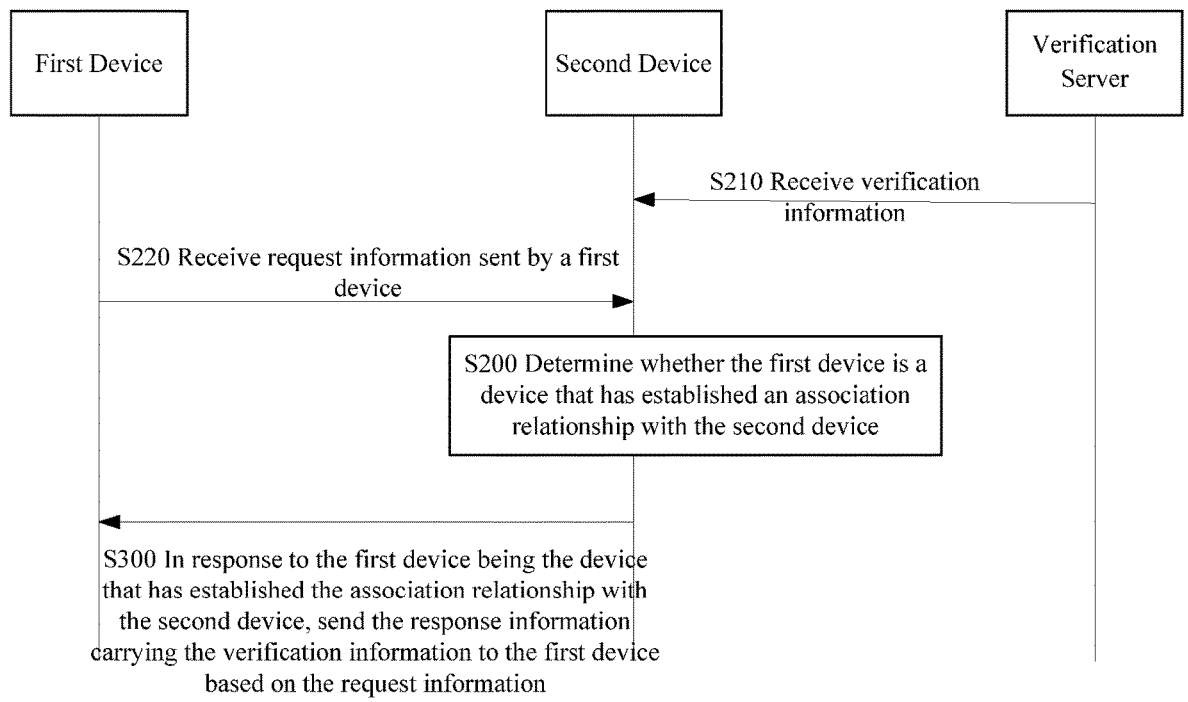
FIG. 3B is a schematic flow chart showing a verification information processing method according to one or more examples of the present disclosure.
Figure 4:
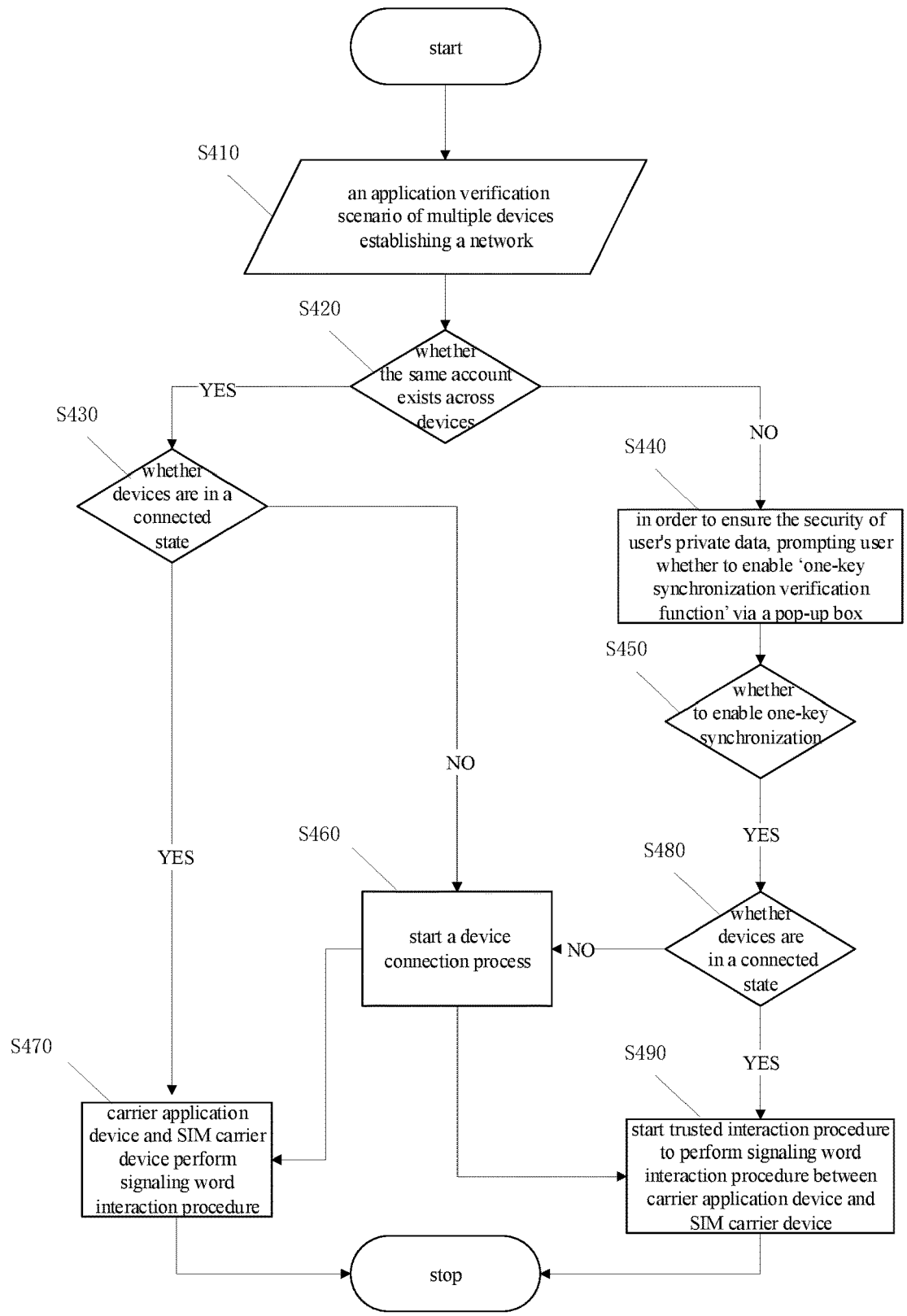
FIG. 4 is a schematic flow chart showing a verification information processing method according to one or more examples of the present disclosure.

FIG. 3B is a schematic flow chart showing a verification information processing method according to examples, as shown in FIG. 3B, the verification information processing method further includes:

S200: determining whether the first device is a device that has established an association relationship with the second device;

S300: in response to the first device being a device that has established the association relationship with the second device, sending the response information carrying the verification information to the first device based on the request information.

In the examples of the present disclosure, in order to ensure the security of the verification information, before sending the verification information to the first device, it is determined whether the first device and the second device have established an association relationship. If the association relationship has been established, then, based on the request information, the response information carrying the verification information is sent to the first device; if the association relationship has not been established, the response information without the verification information can be sent.

In some examples, the step of S200 may include at least one of the following:
- determining whether the first device is a device that shares an account with the second device;
- determining whether the second device has enabled the verification information synchronization function with respect to the first device.

In the example of the present disclosure, it needs to determine whether the first device is a device sharing an account with the second device.

In the examples of the present disclosure, the determining whether the first device is a device that shares an account with the second device can be determined through information interaction and/or device information of a predetermined shared account.

The account shared herein may include at least one of a user account, a network account, and/or a payment account, as mentioned above.

In some examples, when determining that at least one of the first device and the second device has enabled the verification information synchronization function, the association relationship established between the first device and the second device should be determined, or when determining both of the first device and the second device have enabled the verification information synchronization function, the association relationship established between the first device and the second device should be determined.

In some examples, the verification information processing method further includes the following steps:
- in response to that the first device is not a device that shares an account with the second device and the second device has not enabled the verification information synchronization function with respect to the first device, displaying a prompt for enabling or turning on the verification information synchronization function;
- in response to detecting an input operation for said prompt, determining whether or not to enable or turn on the verification information synchronization function of the second device with respect to the first device.

In some examples, when the first device is not a device sharing an account with the second device and the second device has not enabled the verification information synchronization function with respect to the first device, a prompt for enabling the verification information synchronization function is displayed on the second device. When the input operation for the prompt indicates that the enabling or turning on is approved, the establishment of the association relationship between the first device and the second device is achieved by means of enabling the verification information synchronization function. In some examples, after receiving the request information sent by the first device, the second device determines that the first device is not a device that shares an account with the second device and has not yet enabled the verification information synchronization function with respect to the first device, then the prompt for enabling or turning on the verification information synchronization function is displayed on the second device.

Regarding to the application scenes of the present application, in the context of the Internet, terminal devices are becoming more and more diversified, and there are more and more terminal devices owned by individuals or families, such as tablet computers (PAD), personal computers (PC), smart TVs (TV), Bracelets, watches, etc., most of these devices do not have a SIM/USIM carrier, and the applications supported by these devices are diverse or partly the same. It is too cumbersome for performing the device verification cross SIM/USIM carriers and even waste a lot of time. For example, one scene is that a user wants to install a certain learning application in his PAD device, when the user enters a verification code for installation, he needs to find his mobile phone, waits for the network to send the verification code to his mobile phone, and then unlocks the mobile phone to view the verification code, and finally manually input the verification code into his PAD to perform a verifying process. These series of processes are very complicated and cumbersome. Therefore, the present disclosure is needed to solve and optimize related scenarios.

In view of this, some examples of the present disclosure provide a verification information processing method, which may include:

S410: in response to that a plurality of devices wants to establish a network (i.e., networking with each other), entering a verification scenario of applications. The verification scenarios herein may at least include a verification scenario of application installation. In other examples, the verification scenario may further include: a verification scenario of application uninstallation and/or a verification scenario of application update.

S420: determining whether the same account exists across the plurality of devices, that is, determining whether the plurality of devices share an account; if the same account exists across the plurality of devices, turning to S430, or if there is no same account, turning to S440;

S430: determining whether the plurality of devices are in a connected state; that is, whether two devices that need to transmit verification information to each other have established a connection; if there is a connection between devices, turning to S470; if there is no connection between devices, turning to S460;

S440: in order to ensure the security of the user's private data, prompting the user whether to enable 'one-key synchronization verification function' via a pop-up box, wherein the 'one-key synchronization verification function' is one of the aforementioned verification information synchronization functions. In order to simplify user operations, for the 'one-key synchronization verification function', in the examples of the present disclosure, the user can perform an operation (such as a click operation) to a control corresponding to the 'one-key synchronization verification function' on any one of the two devices that need to perform the transmission of verification information. If the control corresponding to the "one-key synchronization verification function" is activated, it is considered that the verification information synchronization function is enabled.

S450: determining whether or not to enable the 'one-key synchronization verification function'; if the user wants to enable the 'one-key synchronization verification function', turning to S480;

S460: starting a device connection process;

S470: performing, by a carrier application device (which corresponds to the first device mentioned above) and a SIM carrier device (which corresponds to the second device mentioned above), a signaling word interaction procedure;

S480: determining whether devices are in a connected state; if they are, turning to S490; if not, turning to S460;

S490: starting a trusted interaction procedure to perform the signaling word interaction procedure between the carrier application device and the SIM carrier device.

The signaling word interaction procedure mentioned above can be as follows.

The carrier application device initiates a control signaling to obtain a signaling word containing the verification information. For example, the carrier application device initiates a signaling word for obtaining the latest short message of the SIM carrier device;

The SIM carrier device parses the received signaling word to obtain content transmission response information (Rsp), and send Rsp to the carrier application device;

The carrier application device parses and decodes the received Rsp to obtain verification information, and writes the verification information to the corresponding position, for example, writes it into the application for establish a network each other to complete the subsequent verification process.

Figure 5:
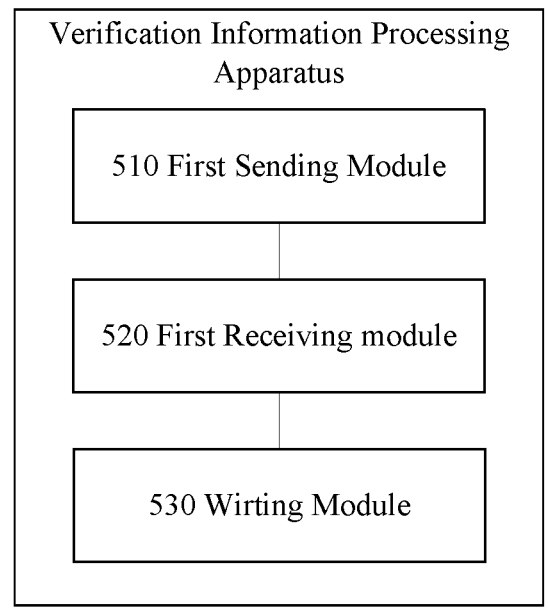
FIG. 5 is a schematic structural diagram of a verification information processing apparatus according to one or more examples of the present disclosure.

As shown in FIG. 5, an example of the present disclosure provides a verification information processing apparatus, which is applied to a first device, and the apparatus may include a first sending module 510, a first receiving module 520 and a writing module 530.

The first sending module 510 is configured to send request information to a second device, in response to entering a verification scenario of performing a predetermined function.

The first receiving module 520 is configured to receive response information returned based on the request information.

The writing module 530 is configured to write verification information carried in the response information into an input position of the verification information; wherein the verification information written into the input position is used to verify whether the first device performs the predetermined function.

In some examples, the first sending module 510, the first receiving module 520, and the writing module 530 are all program modules; after the program modules are executed by the processor, the first device can obtain verification information from the second device and write it into the input position of the verification information by itself.

In other examples, the first sending module 510, the first receiving module 520, and the writing module 530 may all be software-hardware combined modules; the software-hardware combined modules may include various programmable arrays. The programming arrays include, but are not limited to: complex programmable arrays and/or field programmable arrays.

In some other examples, the first sending module 510, the first receiving module 520, and the writing module 530 may be pure hardware modules. The pure hardware modules include, but are not limited to, application specific integrated circuits.

In some examples, the first sending module 510 may include a determining sub-module and a sending sub-module.

The determining sub-module is configured to determine whether the second device is a device that has established a preset association relationship with the first device, in response to entering the verification scenario of performing the predetermined function.

The sending sub-module is configured to send the request information to the second device, in response to the second device being the device that has established the preset association relationship with the first device.

In some examples, the determining sub-module is used to determine whether the second device is a device that shares an account with the first device; or determine whether the first device has enabled a verification information synchronization function with respect to the second device.

In some examples, the apparatus further includes a first displaying module and a first determining module.

The first displaying module is configured to, in response to that the second device is not the device that shares the account with the first device, and the first device has not enabled the verification information synchronization function with respect to the second device, display a prompt for enabling the verification information synchronization function.

The first determining module is configured to detect an input operation for the prompt of enabling to determine whether to enable the verification information synchronization function of the first device with respect to the second device.

In some examples, the first sending module 510 is configured to, before sending the request information to the second device, determine whether the first device and the second device have established a connection; and in response to the first device and the second device have established the connection, send the request information to the second device through the connection.

In some examples, the verification scenario of performing the predetermined function includes, but is not limited to, at least one of following scenarios:
 a verification scenario for application installation;
 a verification scenario for a plurality of devices to establish a network;
 a verification scenario for payment;
 a verification scenario for changing account information, wherein a change of the account information comprises: a change of an account name and/or a change of a password;
 a verification scenario for login in or registering; or
 a verification scenario for creating a group.

In some examples, the first device is a device without a subscriber identity module installed, and the second device is a device with a subscriber identity module installed, and wherein identification information of the subscriber identity module of the second device is identification information obtained in the verification scenario.

Figure 6:
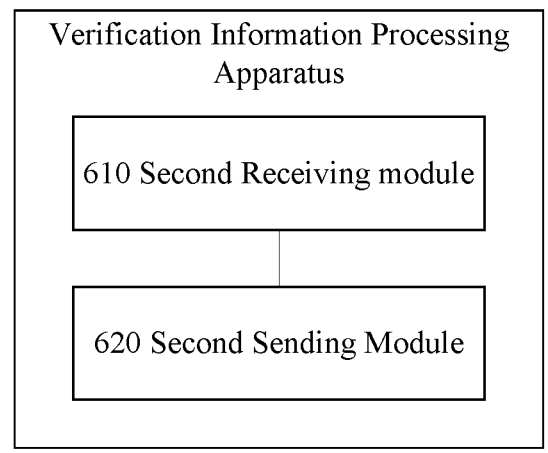
FIG. 6 is a schematic structural diagram of a verification information processing apparatus according to one or more examples of the present disclosure.

As shown in FIG. 6, an example of the present disclosure provides a verification information processing apparatus, which is applied to a second device, and the apparatus includes a second receiving module 610 and a second sending module 620.

The second receiving module 610 is configured to receive verification information and receive request information sent by a first device.

The second sending module 620 is configured to, based on the request information, send response information carrying the verification information to the first device, wherein the verification information is used by the first device to verify whether the first device performs a predetermined function.

In some examples, the second receiving module 610 and the second sending module 620 may be program modules.

After the program modules are executed by the processor, the foregoing operations can be implemented.

In some examples, the apparatus further includes a second determining module, which is configured to determine whether the first device is a device that has established an association relationship with the second device.

The second sending module 620 is further configured to, in response to the first device being the device that has established the association relationship with the second device, sending the response information carrying the verification information to the first device based on the request information.

In some examples, the second determining module is configured to perform at least one of: determine whether the first device is a device that shares an account with the second device; or determine whether the second device has enabled a verification information synchronization function with respect to the first device.

In some examples, the apparatus further includes a second displaying module and an enabling module.

The second displaying module is configured to, in response to that the first device is not the device that shares the account with the second device, and the second device has not enabled the verification information synchronization function with respect to the first device, display a prompt for enabling the verification information synchronization function; and The enabling module is configured to detect an input operation for the prompt of enabling to determine whether to enable the verification information synchronization function of the second device with respect to the first device.

The examples of the present disclosure provide a terminal device, including:
- a memory for storing instructions executable by a processor;
- the processor connected with the memory;

The processor is configured to execute the verification information processing method provided by any of the foregoing technical solutions.

The processor may include various types of storage media. The storage media is a non-transitory computer storage medium that can continue to memorize and store information thereon after the terminal device is powered off.

The processor may be connected to the memory via a bus or the like to read executable programs stored on the memory, for example, so as to be able to execute at least one of the methods shown in any of FIG. 1, FIG. 2, FIG. 3A, FIG. 3B to FIG. 4.

Figure 7:
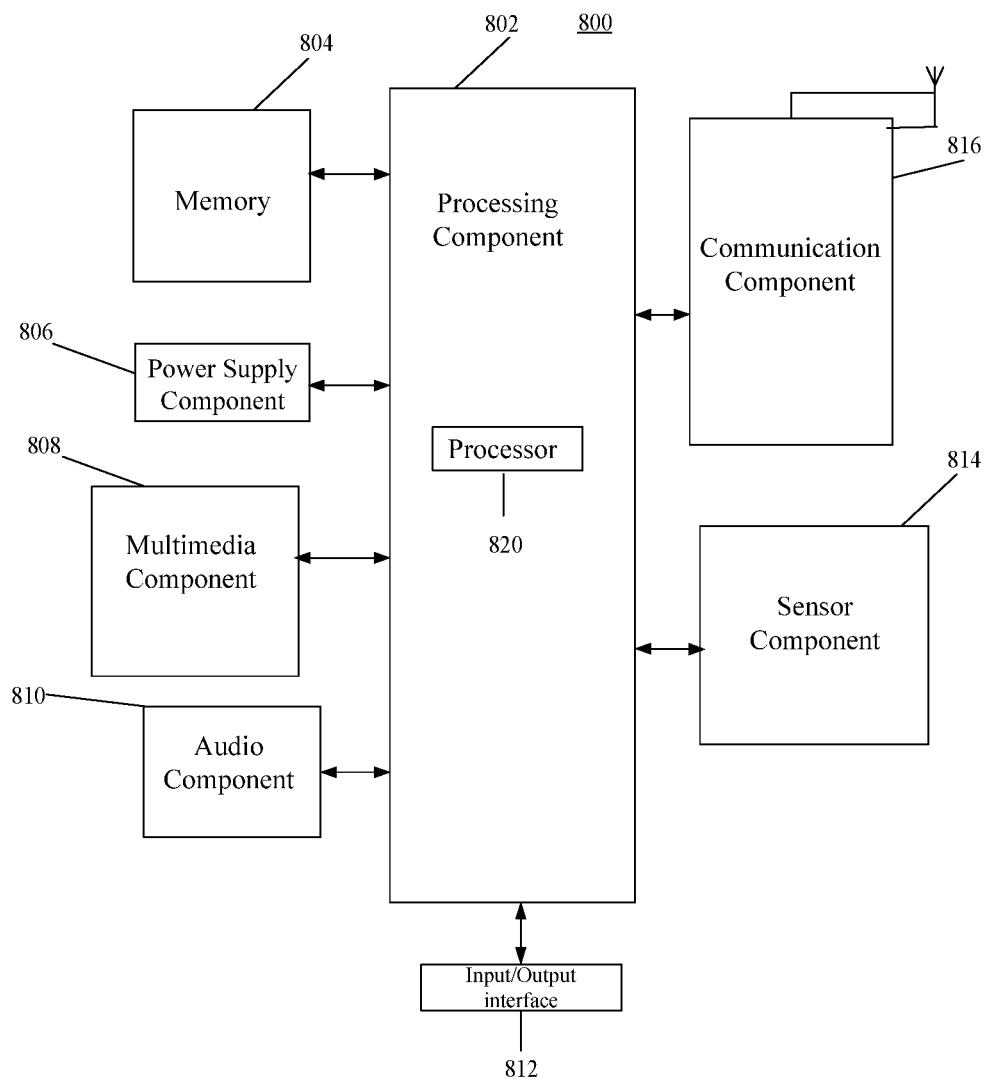
FIG. 7 is a schematic structural diagram of a terminal device according to one or more examples of the present disclosure.

FIG. 7 is a block diagram showing a terminal device 800 according to an example of the present disclosure. For example, the terminal device 800 may be included in terminal devices (such as mobile phones, mobile computers) or servers, etc. In short, data processing terminal device 800 can be included in any terminal device.

Referring to FIG. 7, the terminal device 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the device 800, such as operations associated with displaying, telephone calls, data communication, camera operations, and recording operations. The processing component 802 may include one or more processors 820 to execute instructions to complete all or part of the steps in the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the device 800. Examples of these data include instructions for any application or method operating on the terminal device 800, contact data, phone book data, messages, pictures, videos, and so on. The memory 804 may be implemented by any type of volatile or non-volatile storage device or a combination of the any type of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the terminal device 800. The power supply component 806 may include a power supply management system, one or more power supplies, and other components associated with generating, managing, and distributing power for the terminal device 800.

The multimedia component 808 includes a screen that provides an output interface between the terminal device 800 and the user. In some examples, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense a boundary of the touching operation or swiping operation, but also detect a duration and pressure related to the touching operation or swiping operation. In some examples, the multimedia component 808 includes a front camera and/or a rear camera. When the terminal device 800 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 810 is configured to output and/or input audio signals. For example, the audio component 810 includes a microphone (MIC). When the terminal device 800 is in an operation mode, such as a call mode, a recording mode, and a voice recognition mode, the microphone is configured to receive an external audio signal. The received audio signal may be further stored in the memory 804 or transmitted via the communication component 816. In some examples, the audio component 810 further includes a speaker for outputting audio signals.

The I/O interface 812 provides an interface between the processing component 802 and a peripheral interface module. The peripheral interface module may be a keyboard, a click wheel, a button and so on. These buttons may include, but are not limited to: home button, volume button, start button, and lock button.

The sensor assembly 814 includes one or more sensors for providing the status assessment of various aspects for the terminal device 800. For example, the sensor component 814 can detect the on/off state of the terminal device 800, and the relative positioning of the components, for example, the component is a display and a keypad of the terminal device 800, and the sensor component 814 can also detect the position change of the terminal device 800 or a component of the terminal device 800, the presence or absence of user contact with the terminal device 800, the orientation or acceleration/deceleration of the device 800, and the temperature change of the terminal device 800. The sensor assembly 814 may include a proximity sensor configured to detect the presence of nearby objects without any physical contact. The sensor assembly 814 may also include a light sensor, such as a CMOS or CCD image sensor, for use in imaging applications. In some examples, the sensor assembly 814 may also include an acceleration sensor, a gyro sensor, a magnetic sensor, a pressure sensor, or a temperature sensor.

The communication component 816 is configured to facilitate wired or wireless communication between the device 800 and other devices. The terminal device 800 can access a wireless network based on a communication standard, such as WiFi, 2G, or 3G, or a combination of the communication standard. In an example, the communication component 816 receives a broadcast signal or broadcast related information from an external broadcast management system via a broadcast channel. In an example, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the terminal device 800 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the interface display method described in any of the above examples.

In an example, there is also provided a non-transitory computer-readable storage medium including instructions, such as a memory 804 including instructions, which can be executed by the processor 820 of the terminal device 800 to complete the above method. For example, the non-transitory computer-readable storage medium may be ROM, random access memory (RAM), CD-ROM, magnetic tape, floppy disk, optical data storage device, or the like.

The examples of the present disclosure provide a non-temporary computer readable storage medium that, when the instruction in the storage medium is executed by the UE's processor, enables the UE or the base station to perform the verification information processing method provided by any of the foregoing examples and to perform at least one of the methods shown in FIG. 1, FIG. 2, FIG. 3A, FIG. 3B and FIG. 4.

The verification information processing method applied in the first device may include: in response to entering a verification scenario of performing a predetermined function, sending request information to a second device; receiving response information returned based on the request information; and writing verification information carried in the response information into an input position of the verification information; wherein the verification information written into the input position is used to verify whether the first device performs the predetermined function.

It is understandable that the in response to entering the verification scenario of performing the predetermined function, sending request information to the second device further includes: in response to entering the verification scenario of performing the predetermined function, determining whether the second device is a device that has established a preset association relationship with the first device; and in response to the second device being the device that has established the preset association relationship with the first device, sending the request information to the second device.

It is understandable that the determining whether the second device is the device that has established a preset association relationship with the first device may include: determining whether the second device is a device that shares an account with the first device; or determining whether the first device has enabled a verification information synchronization function with respect to the second device.

It is understandable that the verification information processing method further include, in response to that the second device is not the device that shares the account with the first device, and the first device has not enabled the verification information synchronization function with respect to the second device, displaying a prompt for enabling the verification information synchronization function; and detecting an input operation for the prompt of enabling to determine whether to enable the verification information synchronization function of the first device with respect to the second device.

It is understandable that the in response to entering the verification scenario of performing the predetermined function, sending request information to the second device may include: before sending the request information to the second device, determining whether the first device and the second device have established a connection; and in response to the first device and the second device have established the connection, sending the request information to the second device through the connection.

It is understandable that the verification scenario of performing the predetermined function comprises at least one of following scenarios: a verification scenario for application installation; a verification scenario for a plurality of devices to establish a network; a verification scenario for payment; a verification scenario for changing account information, wherein a change of the account information comprises: a change of an account name and/or a change of a password; a verification scenario for login in or registering; or a verification scenario for creating a group.

For the examples mentioned above, the first device is a device without a subscriber identity module installed, and the second device is a device with a subscriber identity module installed, and the identification information of the subscriber identity module of the second device is identification information obtained in the verification scenario.

The verification information processing method applied in the second device may include: receiving verification information; receiving request information sent by a first device; and based on the request information, sending response information carrying the verification information to the first device, wherein the verification information is used by the first device to verify whether the first device performs a predetermined function.

It is understandable that the verification information processing method further includes determining whether the first device is a device that has established an association relationship with the second device; wherein the based on the request information, sending response information carrying the verification information to the first device may include: in response to the first device being the device that has established the association relationship with the second device, sending the response information carrying the verification information to the first device based on the request information.

It is understandable that the determining whether the first device is the device that has established the association relationship with the second device may include at least one of: determining whether the first device is a device that shares an account with the second device; or determining whether the second device has enabled a verification information synchronization function with respect to the first device.

It is understandable that the verification information processing method further includes: in response to that the first device is not the device that shares the account with the second device, and the second device has not enabled the verification information synchronization function with respect to the first device, displaying a prompt for enabling the verification information synchronization function; and detecting an input operation for the prompt of enabling to determine whether to enable the verification information synchronization function of the second device with respect to the first device.

Those skilled in the art will easily think of other examples of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

It should be noted that in the present disclosure, relationship terms such as first and second are only used to distinguish one entity or operation from another entity or operation, and do not necessarily require or imply that there is any such actual relationship or sequence between these entities or operations. The terms 'include', 'comprise', or any other variants thereof are intended to cover non-exclusive inclusion, so that a process, method, article or device that includes a series of elements includes not only those elements, but also includes other elements that are not explicitly listed or also includes elements inherent to such process, method, article, or device. If there are no more restrictions, the element defined by the sentence "includes a . . . " does not exclude the existence of other identical elements in the process, method, article, or equipment that includes the element.

The methods and apparatus provided by the examples of the present disclosure are described in detail above. Specific examples are used in the present disclosure to illustrate the principles and implementations of the present disclosure. The descriptions of the above examples are only used to help understand the method and the core idea thereof of the present disclosure. At the same time, for those of ordinary skill in the art, according to the ideas of this disclosure, there will be changes in the specific implementation and the scope of the present disclosure. In summary, the content of this specification should not be construed as restrictions on the present disclosure.

What is claimed is:

1. A verification information processing method, comprising:
    in response to entering a verification scenario of performing a predetermined function, obtaining, by a first device, communication identification of a second device according to an input at an input position for inputting the communication identification on a verification interface and sending, by the first device, request information to the second device, wherein the first device is a device without a subscriber identity module installed, and the second device is a device with a subscriber identity module installed, and the communication identification is identification information of the subscriber identity module of the second device;
    receiving, by the first device, response information returned based on the request information; and
    writing, by the first device, verification information carried in the response information into an input position of the verification information, wherein the verification information written into the input position is configured to verify whether the first device performs the predetermined function.

2. The method according to claim 1, wherein in response to entering the verification scenario of performing the predetermined function, sending the request information to the second device comprises:
    in response to entering the verification scenario of performing the predetermined function, determining whether the second device has established an association relationship with the first device; and
    in response to determining that the second device has established the association relationship with the first device, sending the request information to the second device.

3. The method according to claim 2, wherein determining whether the second device is the device that has established an association relationship with the first device comprises:
    determining whether the second device shares an account with the first device; or
    determining whether the first device has enabled a verification information synchronization function with respect to the second device.

4. The method according to claim 3, further comprising:
    in response to determining that the second device does not share the account with the first device, and the first device has not enabled the verification information synchronization function with respect to the second device, displaying a prompt for enabling the verification information synchronization function; and
    detecting an input operation for the prompt of enabling to determine whether to enable the verification information synchronization function of the first device with respect to the second device.

5. The method according to claim 1, wherein in response to entering the verification scenario of performing the predetermined function, sending the request information to the second device comprises:
    before sending the request information to the second device, determining whether the first device and the second device have established a connection; and in response to determining that the first device and the second device have established the connection, sending the request information to the second device through the connection.

6. The method according to claim 1, wherein the verification scenario of performing the predetermined function comprises at least one of following scenarios:
   a verification scenario for application installation;
   a verification scenario for a plurality of devices to establish a network;
   a verification scenario for payment;
   a verification scenario for changing account information, wherein a change of the account information comprises: a change of an account name and/or a change of a password;
   a verification scenario for login in or registering; or
   a verification scenario for creating a group.

7. A non-temporary computer-readable storage medium with a computer program stored thereon, wherein when the computer program is executed by a processor, the processor implements steps in the verification information processing method according to claim 1.

8. A verification information processing method, comprising:
   receiving, by a second device, verification information;
   receiving, by the second device, request information sent by a first device, wherein in response to entering a verification scenario of performing a predetermined function, the first device obtains communication identification of the second device according to an input at an input position for inputting the communication identification on a verification interface, wherein the first device is a device without a subscriber identity module installed, and the second device is a device with a subscriber identity module installed, and the communication identification is identification information of the subscriber identity module of the second device; and
   based on the request information, sending, by the second device, response information carrying the verification information to the first device, wherein the verification information is used by the first device to verify whether the first device performs a predetermined function.

9. The method according to claim 8, further comprising:
   determining whether the first device has established an association relationship with the second device;
   wherein based on the request information, sending response information carrying the verification information to the first device comprises:
   in response to determining that the first device has established the association relationship with the second device, sending the response information carrying the verification information to the first device based on the request information.

10. The method according to claim 9, wherein determining whether the first device has established the association relationship with the second device comprises at least one of following acts:
    determining whether the first device shares an account with the second device; or
    determining whether the second device has enabled a verification information synchronization function with respect to the first device.

11. The method according to claim 10, further comprising:
    in response to determining that the first device does not share the account with the second device, and the second device has not enabled the verification information synchronization function with respect to the first device, displaying a prompt for enabling the verification information synchronization function; and
    detecting an input operation for the prompt of enabling to determine whether to enable the verification information synchronization function of the second device with respect to the first device.

12. A terminal device, comprising:
    memory for storing instructions executable by a processor;
    the processor configured to connect with the memory for implementing the verification information processing method according to claim 8.

13. The terminal device according to claim 12, wherein the processor is further configured to:
    determine whether the first device has established an association relationship with the second device; and
    in response to determining that the first device has established the association relationship with the second device, send the response information carrying the verification information to the first device based on the request information.

14. The terminal device according to claim 13, wherein the processor is configured to:
    determine whether the first device shares an account with the second device; or
    determine whether the second device has enabled a verification information synchronization function with respect to the first device.

15. A terminal device, comprising:
    memory for storing instructions executable by a processor;
    the processor configured to connect with the memory;
    wherein the processor is configured to:
    in response to entering a verification scenario of performing a predetermined function, obtain communication identification of a second device according to an input at an input position for inputting the communication identification on a verification interface and send request information to the second device, wherein the first device is a device without a subscriber identity module installed, and the second device is a device with a subscriber identity module installed, and the communication identification is identification information of the subscriber identity module of the second device;
    receive response information returned based on the request information; and
    write verification information carried in the response information into an input position of the verification information, wherein the verification information written into the input position is configured to verify whether the first device performs the predetermined function.

16. The terminal device according to claim 15, wherein the processor is configured to:
    in response to entering the verification scenario of performing the predetermined function, determine whether the second device has established an association relationship with the first device; and
    in response to determining that the second device has established the association relationship with the first device, send the request information to the second device.

17. The terminal device according to claim 16, wherein the processor is configured to:

determine whether the second device shares an account with the first device; or determine whether the first device has enabled a verification information synchronization function with respect to the second device.

18. The terminal device according to claim 17, wherein the processor is further configured to:

in response to determining that the second device does not shares the account with the first device, and the first device has not enabled the verification information synchronization function with respect to the second device, display a prompt for enabling the verification information synchronization function; and detect an input operation for the prompt of enabling to determine whether to enable the verification information synchronization function of the first device with respect to the second device.

19. The terminal device according to claim 15, wherein the processor is configured to:

before sending the request information to the second device, determine whether the first device and the second device have established a connection; and in response to determining that the first device and the second device have established the connection, send the request information to the second device through the connection.

* * * * *